US011934302B2

(12) United States Patent
Jayaprasad et al.

(10) Patent No.: US 11,934,302 B2
(45) Date of Patent: Mar. 19, 2024

(54) MACHINE LEARNING METHOD TO REDISCOVER FAILURE SCENARIO BY COMPARING CUSTOMER'S SERVER INCIDENT LOGS WITH INTERNAL TEST CASE LOGS

(71) Applicant: Dell Products L.P., Round Rock, TX (US)

(72) Inventors: Sankunny Jayaprasad, Round Rock, TX (US); Jason Fay, Cedar Park, TX (US); Araiz Abdul Baqi, Pflugerville, TX (US); Saheli Saha, Kolkata (IN); Guhesh Swaminathan, Chennai (IN); Ramakanth Kanagovi, Bengaluru (IN)

(73) Assignee: DELL PRODUCTS L.P., Round Rock, TX (US)

( * ) Notice: Subject to any disclaimer, the term of this patent is extended or adjusted under 35 U.S.C. 154(b) by 170 days.

(21) Appl. No.: 17/647,131

(22) Filed: Jan. 5, 2022

(65) Prior Publication Data

US 2023/0214317 A1    Jul. 6, 2023

(51) Int. Cl.
*G06F 11/36* (2006.01)
*G06N 5/022* (2023.01)
*G06N 5/04* (2023.01)

(52) U.S. Cl.
CPC ...... *G06F 11/3692* (2013.01); *G06F 11/3688* (2013.01); *G06N 5/022* (2013.01); *G06N 5/04* (2013.01)

(58) Field of Classification Search
CPC .. G06F 11/36; G06F 11/3692; G06F 11/3688; G06N 5/022
See application file for complete search history.

(56) References Cited

U.S. PATENT DOCUMENTS

| 11,334,421 | B2* | 5/2022 | Sethi | G06F 11/0757 |
|---|---|---|---|---|
| 2009/0240990 | A1* | 9/2009 | Gollub | G06F 11/079 |
| | | | | 714/45 |
| 2018/0137001 | A1* | 5/2018 | Zong | G06N 5/022 |
| 2019/0034517 | A1* | 1/2019 | Byrd | G06F 17/40 |
| 2019/0347282 | A1* | 11/2019 | Cai | G06N 5/022 |
| 2022/0188280 | A1* | 6/2022 | Bakhov | G06F 11/3079 |
| 2022/0222047 | A1* | 7/2022 | Todirel | G06F 11/3608 |
| 2023/0245011 | A1* | 8/2023 | Tiwari | G06Q 10/063112 |
| | | | | 705/7.14 |

* cited by examiner

*Primary Examiner* — Kamini B Patel
(74) *Attorney, Agent, or Firm* — Workman Nydegger

(57) ABSTRACT

One example method includes acquiring data from a knowledge base that includes message codes indicating conditions that occurred during performance of one or more test runs of a computing operation, and the message codes are included in message code sequences, processing the data by mapping the message codes, and message codes included in a customer issue log, to codes that are readable by a machine learning process, transforming the data to generate an output that comprises, for each message code sequence, relationships between each of the message codes in that message code sequence, extracting features from the transformed data, and the extracting generates multiple datasets that include the features, performing a similarity comparison by comparing a customer field issue with the datasets, and based on the similarity comparison, identifying and recommending a solution to the customer field issue.

18 Claims, 6 Drawing Sheets

FIG. 2

| | | | | | | | | | | |
|---|---|---|---|---|---|---|---|---|---|---|
| USR0030 | USR0032 | WRK0001 | USR0030 | USR0032 | USR0030 | USR0032 | USR0030 | USR0030 | LOG007 | USR0030 |
| SEL9901 | OSE1002 | JCP037 | LOG007 | USR0030 | USR0030 | LOG007 | UEFI0323 | USR0030 | ISM0007 | SYS1003 |
| USR0030 | SYS1000 | LOG007 | USR0030 | USR0030 | SYS1001 | SYS1003 | SYS1001 | PR6 | USR0030 | LOG007 |
| USR0030 | UEFI0323 | LOG007 | USR0030 | SYS1005 | LOG007 | USR0030 | USR0030 | SYS1003 | LOG007 | USR0030 |
| SYS1000 | USR0030 | SEL9901 | OSE0003 | SYS1001 | SYS1005 | USR0030 | SYS1005 | RED030 | RAC0702 | USR0030 |
| RED029 | JCP027 | USR107 | USR0030 | USR0030 | USR0032 | LOG007 | USR0030 | USR0030 | USR107 | USR0030 |
| USR107 | LOG007 | USR0030 | USR0032 | USR0030 | LOG007 | USR0030 | USR0032 | USR0030 | USR0030 | SEL9901 |
| OSE1002 | JCP037 | LOG007 | USR0030 | UEFI0323 | LOG007 | USR0032 | USR0030 | USR0030 | LOG007 | USR0030 |
| SYS1000 | LOG007 | USR0030 | SYS1001 | SYS1005 | SYS1003 | LOG007 | USR0030 | PR6 | LOG007 | USR0030 |
| UEFI0323 | LOG007 | USR0030 | SYS1003 | LOG007 | USR0030 | USR0030 | SYS1003 | SYS1000 | MEM8501 | MEM8500 |

| | | | | | | | | | | |
|---|---|---|---|---|---|---|---|---|---|---|
| 692 | 363 | 629 | 692 | 363 | 692 | 363 | 692 | 660 | 692 | 692 |
| 342 | 486 | 285 | 660 | 692 | 260 | 660 | 131 | 343 | 131 | 131 |
| 692 | 375 | 660 | 692 | 480 | 480 | 131 | 367 | 692 | 692 | 660 |
| 692 | 523 | 660 | 692 | 260 | 260 | 692 | 131 | 660 | 692 | 692 |
| 375 | 692 | 342 | 681 | 480 | 363 | 131 | 681 | 140 | 343 | 692 |
| 476 | 337 | 439 | 363 | 260 | 692 | 660 | 692 | 439 | 692 | 692 |
| 439 | 660 | 692 | 692 | 363 | 523 | 692 | 660 | 692 | 660 | 342 |
| 486 | 285 | 660 | 260 | 131 | 660 | 367 | 131 | 660 | 660 | 692 |
| 375 | 660 | 692 | 131 | 692 | 131 | 375 | 692 | 660 | 660 | 692 |
| 523 | 660 | 692 | | 692 | 692 | | 692 | 296 | | 159 |

300, 302

400

| | ('341', '126') | ('341', '134') | ('341', '157') | ('341', '170') | ('341', '189') | ('341', '190') | ('341', '194') | ('341', '198') | ('341', '203') | ('341', '220') | ('341', '221') | ('341', '237') | ('341', '238') | ('341', '329') | ('341', '330') |
|---|---|---|---|---|---|---|---|---|---|---|---|---|---|---|---|
| 0 | 0.2043 | 0.9894 | 0.6392 | 0.5967 | 0.0137 | 0.6151 | 0.2756 | 0.0672 | 0.6199 | 0.2181 | 0.5823 | 0.5737 | 0.1076 | 0.4829 | 0.4291 |
| 1 | 0.5776 | 0.0364 | 0.6721 | 0.2851 | 0.5259 | 0.7097 | 0.329 | 0.5886 | 0.7768 | 0.4186 | 0.3422 | 0.1885 | 0.7986 | 0.7202 | 0.882 |
| 2 | 0.7093 | 0.3694 | 0.1469 | 0.179 | 0.5997 | 0.6028 | 0.6924 | 0.0229 | 0.7659 | 0.6072 | 0.5421 | 0.5656 | 0.5431 | 0.1962 | 0.9761 |
| 3 | 0.33 | 0.3832 | 0.3254 | 0.7429 | 0.7616 | 0.5958 | 0.988 | 0.1376 | 0.946 | 0.6809 | 0.146 | 0.5009 | 0.7646 | 0.7701 | 0.7423 |
| 4 | 0.3108 | 0.9486 | 0.0506 | 0.7478 | 0.1045 | 0.7124 | 0.9114 | 0.8918 | 0.7568 | 0.0827 | 0.8729 | 0.4617 | 0.8325 | 0.2213 | 0.965 |
| 5 | 0.3467 | 0.0327 | 0.1096 | 0.7969 | 0.4687 | 0.232 | 0.3279 | 0.7034 | 0.6967 | 0.2082 | 0.8029 | 0.013 | 0.3864 | 0.457 | 0.6297 |
| 6 | 0.7158 | 0.0781 | 0.0996 | 0.3335 | 0.415 | 0.6358 | 0.8828 | 0.6894 | 0.7275 | 0.5726 | 0.1843 | 0.3029 | 0.3641 | 0.4118 | 0.5638 |
| 7 | 0.1471 | 0.7992 | 0.3222 | 0.3294 | 0.5686 | 0.2352 | 0.1081 | 0.3641 | 0.5287 | 0.1663 | 0.3427 | 0.5 | 0.2713 | 0.6021 | 0.0387 |
| 8 | 0.335 | 0.3451 | 0.2082 | 0.6418 | 0.5244 | 0.3338 | 0.6718 | 0.4602 | 0.9637 | 0.3226 | 0.4692 | 0.725 | 0.5417 | 0.3606 | 0.4097 |
| 9 | 0.6146 | 0.0907 | 0.1793 | 0.7251 | 0.7081 | 0.3035 | 0.4126 | 0.3605 | 0.6122 | 0.5671 | 0.8036 | 0.9643 | 0.2977 | 0.0429 | 0.4188 |
| 10 | 0.6346 | 0.2072 | 0.0593 | 0.0629 | 0.1912 | 0.7199 | 0.2836 | 0.3206 | 0.4006 | 0.7929 | 0.0553 | 0.3626 | 0.322 | 0.9854 | 0.842 |
| 11 | 0.6782 | 0.9428 | 0.457 | 0.193 | 0.3498 | 0.7207 | 0.3757 | 0.5276 | 0.8814 | 0.7165 | 0.7577 | 0.0592 | 0.1358 | 0.2328 | 0.3647 |

| ('692'', '363') | ('692'', '681') | ('692'', '131') | ('692'', '375') | ('692'', '296') | ... | ... | ... | ... |
|---|---|---|---|---|---|---|---|---|
| 0.0155 | 0.061 | 0.1112 | 0.121 | 0.0478 | ... | ... | ... | ... |

FIG. 5

MACHINE LEARNING METHOD TO REDISCOVER FAILURE SCENARIO BY COMPARING CUSTOMER'S SERVER INCIDENT LOGS WITH INTERNAL TEST CASE LOGS

FIELD OF THE INVENTION

Embodiments of the present invention generally relate to identification and resolution of customer server problems. More particularly, at least some embodiments of the invention relate to systems, hardware, software, computer-readable media, and methods for identifying recommended solutions for a customer system problem by comparing incident log files from customer servers with internal logs generated by validation test case runs.

BACKGROUND

In the era of Information technology, advancements in products, processes and software packages are made at a rapid pace, increasing the efforts required to benchmark these advancements. Testing, whether it be for software, firmware or hardware, is an investigation carried out for verifying the fitness of the product by executing programs and/or applications committed not only to find failures, but also to check the desired outcomes and performance measures.

With changes in the requirements and development of new products, the complexity of identifying the issue within the product has increased exponentially, thus requiring more resources and time spent. The same is the case for the as-sold products by companies to their customers. The products used by the customers may fail for any number and type of reasons, leading to service requests/incidents being raised by the customer.

In an attempt to order to identify and resolve a problem with a customer system, hardware, and/or software, a support engineer may analyze the issue using the technical logs which may contain the message codes and descriptions received from the customer products. But in order to do so, the support engineer must first understand the logs, after which the support engineer may apply tribal and available product knowledge from a knowledge repository, and sometimes may also use analytics, to determine the list of possible root causes of the issue. The issue may then be reproduced in an attempt to identify a possible resolution. However, all of these activities are time, and resource, consuming and, as a result, can lead to customer dissatisfaction.

Circumstances such as those just described are particularly prevalent in the server world, where the support engineer gains access to the life cycle (LC) logs or the support assist logs from the field issue, that is, the customer systems and equipment, such as servers. The support engineer must go through the entire process noted above to try to resolve the field issue.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 2 discloses aspects of a portion of a knowledge base comprising customer LC logs and/or test run logs.

FIG. 3 discloses an example output of a message code mapping process.

FIG. 4 discloses an example table including output of an SGT process performed on a training dataset.

FIG. 5 is a detail view of a portion of the example table of FIG. 4.

DETAILED DESCRIPTION OF SOME EXAMPLE EMBODIMENTS

Figure 1:
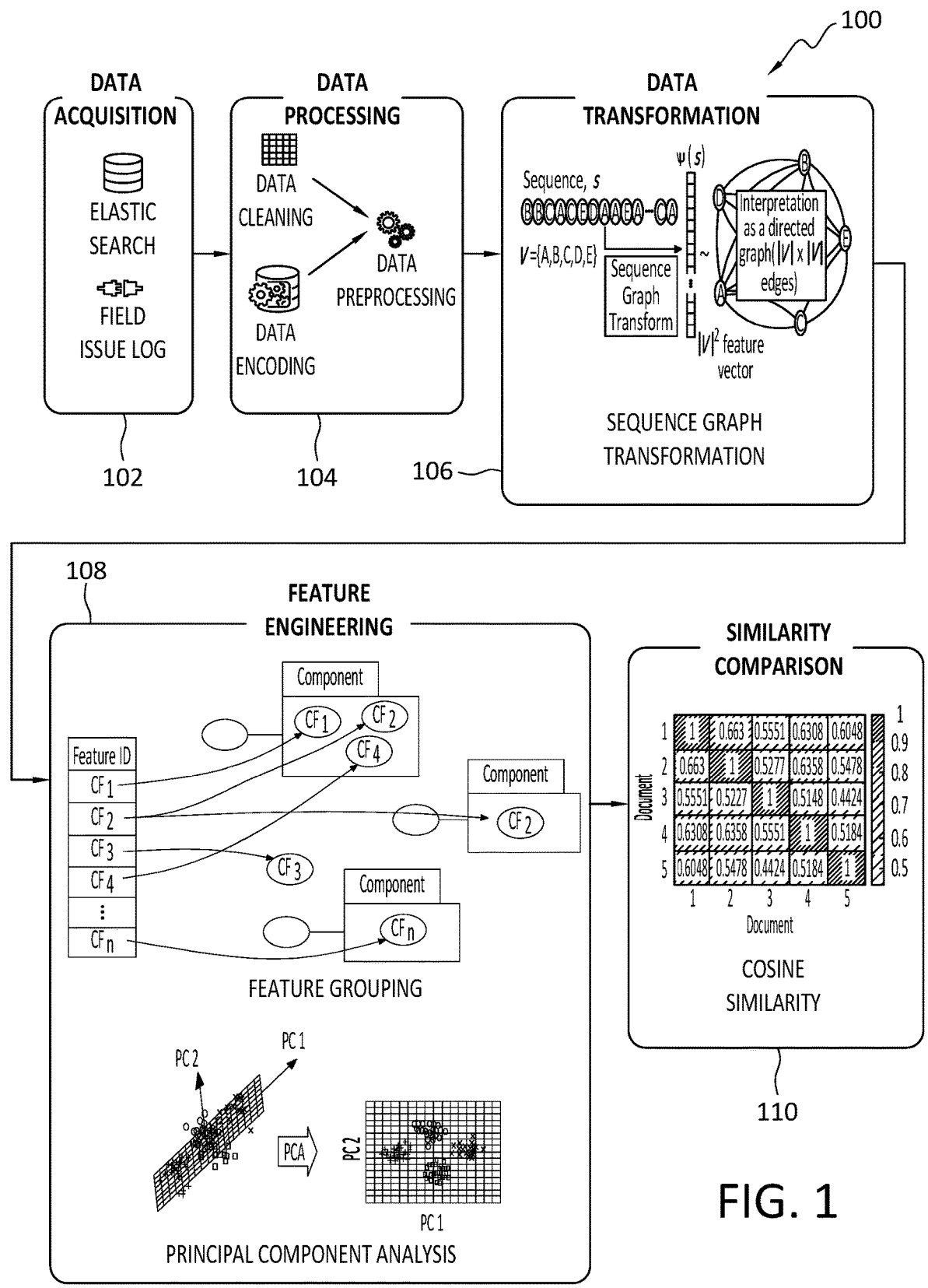
FIG. 1 discloses aspects of an example method and processing pipeline according to some example embodiments.

Embodiments of the present invention generally relate to identification and resolution of customer server problems. More particularly, at least some embodiments of the invention relate to systems, hardware, software, computer-readable media, and methods for identifying recommended solutions for a customer system problem by comparing incident log files from customer servers with internal logs generated by validation test case runs. At least some example embodiments may employ a machine learning (ML) process to identify and resolve customer problems.

In general, example embodiments of the invention may implement processes and methods that are based on a principal component adjusted Sequence Graph Transformation method to compare the log files from customers with the internal logs generated by validation test case runs. This methodology may operate to recommend the most suitable and appropriate steps to reproduce the field issue and accelerate the issue resolution by proper identification of root cause of the issue. That is, example embodiments may be able to leverage test/validation operations data, which anticipates real world customer issues by mimicking the customer operating environment. Such data may have rich empirically available defects-related knowledge, the use of which may help to speed up the customer server issue resolution time. Thus, embodiments may both identify, and resolve, customer issues.

Example embodiments may be based on an ensembled architecture using a weighted approach to factor in the presence of different error severity categories, thereby providing a robust approach to identifying a similar customer issue fingerprint in internal test operations data and resolving the issue faster. Correspondingly, embodiments may also save both time and effort on the part of support engineers.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that customer hardware and/or software problems may be identified, and resolved, relatively more quickly than is possible with conventional problem-solving approaches. As another example, embodiments may analyze, possibly using a machine learning model, a test case knowledge base to diagnose, and resolve, a customer problem, where the test case knowledge base may enable faster, and more accurate, identification of a customer problem than could be obtained with conventional problem-solving approaches. Various other aspects of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Overview

In the product service and support world, important key performance indicators (KPI) for a support engineer are how efficiently and effectively that person can resolve issues raised by customers, and the time duration required to implement the identified resolution(s), so as to provide an acceptable level of customer satisfaction. Typically, a support team may have to resolve hundreds of issues, of various severity levels, raised by customers.

Taking the particular, but non-limiting, example of customer servers, a support engineer may come across many complicated incidents raised by the customers, where such incidents may be raised on a daily basis. Understanding the problem, analyzing the problem, and resolving the problem, is a time-consuming process which in certain cases may cause significant customer dissatisfaction with the company whose server, and/or other products, the customer is using.

Particularly, for each incident, the support engineer may examine the field issue life cycle (LC) logs that may include, for example, of a series of message codes, and corresponding message code descriptions, generated by the server products and describing or disclosing various aspects of one or more problems, such as problems involving the configuration and/or operation of the product. A difficulty however is that there may be hundreds, or thousands, or more, of message codes present in the issue log files which may need to be properly analyzed to ascertain the root cause(s) of the problem. It may be difficult, or impossible, to analyze the message codes in the timely and rigorous way that is needed to satisfactorily support customer operations.

With the foregoing considerations in view, example embodiments may, for example, operate by comparing a customer issue log against an existing knowledge warehouse, or knowledge base, of prior issues involving the hardware and/or software, such as a server for example, that is experiencing problems. The knowledge base may include results from test runs that have been performed and/or may include results and data included in customer logs. This approach may enable a support engineer to identify and solve the issues much faster, using the prior experience and information, concerning such hardware and/or software, that has been registered in the knowledge warehouse. The data in the knowledge warehouse may be used to mimic, such as in a hardware/software validation environment for example, the customer server environment. As noted, a knowledge base may include, but is not limited to, information about one or more test cases, defects, and failed test case run logs, any or all of which may be employed to reproduce the issue, identify the issue root cause, and identify and recommend resolutions. Embodiments of the knowledge base may be leveraged to generate recommendations, possibly on-the-fly as problems are identified, regarding one or more resolutions to a field issue that has been identified in customer software and/or hardware.

For example, some example embodiments may implement a sequence graph transformation process which converts the message codes into machine-readable, multi-parameter, input which may then be passed to a feature engineering block to obtain output which may include, but is not limited to, the correct parameters for problem identification and resolution. This output may then be weighted based on the classification of the error codes, and the similarity of the message code sequences may then be computed.

Thus, an example embodiment may involve a data acquisition process in which data is gathered concerning one or more problems experienced by customer hardware and/or software. The data may include, for example, message code sequences. The message code sequences may be unique to parameters such as a customer, a problem, or a combination of parameters (customer+problem), for example. After the data has been gathered, the data may be processed by mapping the message codes, generated as a result of the problems, with a message code dictionary of a knowledge base. Next, the message a machine learning (ML) process may be employed, in a process that may be referred to herein as a sequence graph transformation (SGT) to identify relationships between/among the message codes in a particular message code sequence included in a customer issue LC log. The output of the SGT, that is, the relationships, may then classified, such as by a feature engineering process, according to their relative criticality, such as, for example, 'Critical,' 'Warning,' or 'Informational.' A dimensionality reduction process may then be performed on the classified data to reduce the amount of data being handled, while largely preserving key aspects of the data that are needed for analysis. Finally, a similarity analysis may be performed between the transformed LC and the data that was classified earlier. As noted, the data may be classified, for example, into 3 datasets, namely, 'Critical,' 'Warning,' and 'Informational' datasets. The similarity analysis may produce a respective score for each dataset, which may be added together to produce a similarity score for a test case that was run against the LC. The message sequence that has the highest score may be used as the basis for selecting a particular recommended solution from the knowledge base. In light of the foregoing, it can be seen that example embodiments may implement a solution which can assist a support engineer, and/or may be provided as-a-service (aaS) to customers embedded within software and/or hardware such as servers, by analyzing the filed issue LC logs using AI/ML to identify issue root causes, and to reproduce the problem that was experienced, thereby speeding up the issue resolution process.

It is noted that various terms may be employed herein. Particularly, the term 'LC logs' and its variations embrace lifecycle controller logs, or simply lifecycle logs, that provide the history of changes related to hardware and/or software components installed on a managed system. Additionally, the term 'SGT' embraces sequence graph transforms which serve as a feature embedding function that can extract varying amounts of short-term to long-term dependencies without increasing the computation needed to obtain that information. The term 'PCA' embraces principal component analysis, which includes techniques for reducing the dimensionality of large datasets, increasing interpretability but at the same time minimizing information loss. Finally, the term 'iDRAC' refers to the Integrated Dell Remote Access Controller, which is designed for secure local and remote server management and helps IT administrators deploy, update, and monitor, Dell EMC PowerEdge servers anywhere, and at any time.

B. Further Aspects of Some Example Embodiments

With reference now to the example pipeline and method 100 of FIG. 1, details are provided concerning aspects of some example embodiments of the invention. In some example implementations, the method 100 may begin with a data acquisition process 102 in which data and metadata concerning customer hardware and/or software problems is collected in a log. The log data and metadata may be retrievably stored in an elastic search database, although no particular type of database is necessarily required.

After the data and metadata have been collected 102, the data and metadata may be subjected to data processing 104 that may involve data cleaning and data encoding. The data cleaning and data encoding may, respectively, remove extraneous data and convert the data into a form that is usable in further operations. The data cleaning and data encoding may comprise elements of data preprocessing operations. Additional, or alternative, operations may be performed at 104 such as, for example, building a dictionary of unique message codes and their corresponding numeric codes, and then transforming the message code sequences to respective numeric codes.

After the data has been processed 104, the data in an LC log may be transformed 106, such as by way of a SGT process. Such a transformation process 106 may comprise, for example, feature encoding each message code sequence, based on short-term and long-term dependency of each message code with itself and with the other message codes in the message code sequence.

Next, a feature engineering process 108 may be performed on the transformed data. The feature engineering process 108 may comprise grouping the transformed data according to the error classes to which the various message codes belong. The feature engineering process 108 may also comprise performance of a dimensionality reduction process on the datasets created as a result of the grouping of the transformed data. The dimensionality reduction process, which may comprise a principal component analysis (PCA), may reduce the size and complexity of the datasets, while largely preserving the key data needed for further analyses.

Finally, a similarity comparison process 110, which may comprise a cosine similarity comparison, may be performed with respect to the datasets that were created earlier. Particularly, performance of the similarity comparison process 110 may comprise, for example, performing a comparison of the transformed issue log with the datasets to obtain respective scores for each dataset, and performing a weighting process to obtain a final similarity score for each test case that was run against the LC. The highest similarity score may then be correlated with a particular recommended solution from the knowledge base, and that solution may then be implemented and checked.

The foregoing elements of the method 100 are provided only by way of example, and different or alternative elements may be employed in some embodiments. Following is a more detailed discussion of each of the elements set forth in FIG. 1.

B.1 Data Acquisition

In one implementation of a data acquisition process, validation Life Cycle (LC) logs from test cases which were run during a defined time period, such as the last 200 days for example, may be collected from an elastic search database. This data may serve as a knowledge base for an ML model to learn the patterns present in the data. Additionally, or alternatively, the knowledge base may comprise data and metadata taken from customer logs that were generated in connection with the operation of customer hardware and/or software.

The knowledge base may include message codes for each problem, error, or circumstance, that resulted from running the test. In some embodiments, a message code may take the form of an alphanumeric code, such as 'USR0030' for example, although no particular message code format is required. A particular component, such as a server for example, may have a unique sequence of message codes that capture or describe one or more aspects of the performance of that component during the test. Note that as used herein, such a 'component' may comprise hardware and/or software. The message codes, along with the test case name and the test case file name, may be extracted from the knowledge base.

In one example test case that was run, about 1500 unique message code sequences were gathered. The message code sequences varied in length from about 10 message codes to about 500 message codes. The number of unique message codes was about 300. As discussed hereafter, the message code sequences may be mined for information that may be used to identify, and resolve, hardware and/or software problems experienced by a customer.

For example, to pattern mine the aforementioned message code sequences so as to derive machine-understandable features, example embodiments may employ a "Sequential graph Transformation" (SGT) method. Advantageously, because SGT may generate, or at least identify, any or all features of each message code, as well as the relation of that message code to all other message codes, using a one-to-many relation-based feature generator technique, a training data set of 1500 unique message code sequences was large enough, in some test cases, to enable generation of generic features capturing a wide-variety of message code relations. In the test case using the training data set of 1500 unique message codes, about 60,000+ features were generated using SGT.

B.2 Data Preprocessing

In general, data preprocessing may involve creation of a dictionary of unique message codes and their corresponding numeric codes. Use of this dictionary may ease the model building activity. In the test case referred to above, 1500 unique sequences of message codes were transformed, or mapped, to their respective numeric codes. Further details concerning such a transformation process are disclosed elsewhere herein.

B.3 Machine Learning (ML)—Driven Log Transformation

The preprocessed data may be transformed, as noted above, using the Sequence Graph Transformation (SGT) methodology which feature encodes each message code sequence based on the short-term and long-term dependency of every message code with itself and other message codes. The use of SGT to perform a transformation of message code sequences may yield significantly superior results in sequence clustering and classification, with higher accuracy and lower computation as compared to conventional methods, such as sequence/string kernels and LSTM (Long Short-Term Memory). As noted, the transformation in the test case resulted in more than 67000 distinct feature combinations formed due to the interaction between each message code in the message code sequences that were obtained from the log(s).

It is noted that SGT is distinct from a Markov Chain, at least in the sense that, the feature values generated in connection with example embodiments do not represent probabilities, but instead represent associations between message codes, quantified based on a distance measure between any two events, or message codes. The following example is illustrative of a distance measure between message codes or events.

In an example message code sequence 'AAFGTRDKLIB,' where each character of the message code sequence is a message code that corresponds to a particular event relating to the operation and/or configuration of customer hardware and/or software, it may be desired to determine an extent to which various message codes are associated with each other, such as by a cause-and-effect relationship, for example. This extent may be expressed in terms of a relative distance measurement between message codes, where a shorter distance between message codes indicates a stronger association between those codes than an association indicated by a longer distance between those message codes.

With reference to the aforementioned example, the association between A and B is established with B preceded by 2 As at the 1st and the 2nd positions in the sequence. On the other hand, K is relatively closer to A than is B, and K is also preceded by 2 As at the 1st and the 2nd positions of the sequence. Given that K is closer to A than B is, that is, the distance measurement from A to K is less than the distance measurement from A to B, the feature engineered between A→K will have a higher value as compared to the value associated with A→B. The relatively higher value of the feature engineered between A→K thus denotes a relatively higher/closer association between A and K, as compared with the association between A and B. Further information concerning an SGT algorithm is disclosed in 'Sequence Graph Transform (SGT): A Feature Embedding Function for Sequence Data Mining," by Chitta Ranjan, Samaneh Ebrahimi, and Kamran Paynabar, Oct. 5, 2021 (https://arxiv.org/pdf/1608.03533.pdf), which is incorporated herein in its entirety by this reference.

B.4 Feature Engineering

Due to the presence, in the test case noted above, and potentially in various example cases, of a huge number of feature combinations, the extraction, discussed above, of only features determined to be relevant may be performed using Principal Component Analysis (PCA), which is an example of a dimensionality reduction technique that may be employed in some example embodiments. In general, dimensionality reduction techniques may help to reduce the size and/or complexity of a dataset, while retaining as much of the data as possible. As such, application of a dimensionality reduction technique may help speed the analysis of a dataset, relative to how the analysis would proceed absent the application of the dimensionality reduction technique.

Before applying PCA to a feature combination, such as the 60,000+ features in the example noted earlier, the transformed data, that is, the features, may be grouped according to the error classes to which the respective message codes of the features belongs. This approach may help in applying weights to the relevant features after the dimensionality reduction has been performed.

In some embodiments, the grouping of features may be performed based on 3 categories of message codes, namely, Critical Codes, Warning Codes, and Informational codes. These codes are presented only by way of example and additional, or alternative, codes may be used to define feature groupings. As used herein, a Critical message code refers to the error message codes which are important in understanding the errors which may arise during the test case run, a Warning message code refers to the possibility of errors happening during a test case run, and an Informational message code provides data about the steps completed as part of the test case run.

In the example test case referred to herein, the feature grouping resulted in approximately 10,000 features in each of the Critical and Warning categories, and the remaining approximately 40,000 features in the Informational category. Thus, the feature grouping process resulted in the creation of three datasets, one for each of the aforementioned categories. A dimensionality reduction process using PCA was applied on these datasets maintaining the feature inclusion percentage to over 90% for each dataset.

Based on the SGT output, which gave nearly 67000 features as noted above, one or more corresponding business rules may be defined and applied to classify the features having any message code which is Critical, Warning, or Informational, in nature. Consider, for example, the 5 message codes MC001, MC002, MC003, MC004, MC005. Applying SGT, one-to-one matching between the message codes results in 20 different combinations of message codes. The business rule in this example is that the message codes are segregated into Critical, Warning, and Informational codes based on the message code information available in a test collateral database. This business rule may be applied to each of the 20 different combination. If there is even one Critical message code, such as MC003, in the example combination (MC001, MC003), the combination (MC001, MC003) may be placed under the Critical (C) category. Similarly, if there is any Warning message code combined with a Critical message code, the combination is placed under the Critical (C) category. Similarly, for other combinations, if there are any message codes in the Warning category, but no Critical message codes, the combination is placed under the Warning (W) category. The remainder, that is, code combinations with no Critical or Warning message codes, are placed under the Informational (I) category.

In this example then, the order of placing each individual feature among the 67k into Critical, Warning and Informative categories and, thus, respective databases, may be governed by the rule set: (1) if there a critical event in a combination of associated features association, then place that combination in the C category; (2) if there is no critical event in a combination of associated features, but the combination includes a warning event, then place that combination in the W category; and, (3) for any combination of associated features that includes no critical events and no warning events, place that combination in the I category. While training the SGT model, application of this rule set to the test case noted above resulted in the categorization of about 9,000 features under category C, categorization of another 9,000 features under category W, and categorization of the balance of about 48,000 features under category I. In this way, three datasets were defined, namely a dataset including the features in the C category, a dataset including the features in the W category, and a dataset including the features in the I category.

A PCA was then applied to each of the datasets to extract features that explain about 90% of the accumulated variance within each category. This resulted in 50 features in the Critical (C) category, 50 features in the Warning (W) category, and about 150 features in the Informational (I) category. Thus, the application of PCA to the three datasets proved to be impactful in avoiding any over-fitting, and in reducing the number of features to be analyzed.

B.4 Similarity Detection

As noted above, PCA may be applied to datasets that include various features. As well, one or more customer LC logs, which may be compared to test run LC logs as disclosed elsewhere herein, may also be transformed using SGT, and PCA may then be applied to the transformed customer LC logs.

In general, embodiments may provide for a similarity detection process that may be used to determine a similarity between a transformed customer LC log and the categorized datasets, that is, the C, W, and I, datasets. In some particular embodiments, a cosine similarity may be performed between the transformed issue log and the categorized datasets to obtain scores against each dataset. The scores against each dataset may then be weighted based on the categorical weightings, which may be obtained through experimentation. These weights may be determined using the formula:

$$\log\left(\frac{N}{1+n_t}\right)+1$$

In this formula, N is the number of training sequences performed, and n t is the number of training sequences which include a certain type of message code, that is, n t generally indicates a frequency with which a certain type of message code appears. The formula may be used to compute weights of each message type, that is, C, W, and I, separately. By application of the formula, message types which appear relatively rarely will be given a relatively higher weight than message types which appear more commonly.

In an example training data set where N=1500, n t for Information was 1500, n t for Warning was 297, and n t for Critical was 98. Thus, the respective weights for C message codes, W message codes, and I message codes, were determined by the aforementioned formula to be 0.99, 1.7, and 2.18. For each test case run against the customer LC, the final scores of the 3 datasets may then be added together to provide the final similarity scores for that test case. Based on the sequence having the highest score, a recommendation may then be provided from the knowledge base.

B.5 Further Discussion

As will be apparent from this disclosure, example embodiments may provide various useful aspects and advantages. For example, one or more embodiments may provide a method to correlate external customer server, or other hardware/software, issues with a knowledge base that may comprise customer hardware/software defect life cycle logs. As well, embodiments may operate to reproduce a customer problem, identify a root cause of that problem, and identify and recommend, to a support engineer for example, a corresponding solution. Some embodiments may also implement the recommended solution, either automatically, or in response to input from a human user.

As another example of features and advantages of some example embodiments, some embodiments may use a weighted similarity method applied on top of sequential graph transformation (SGT) to determine, and assign, higher weightings to critical error messages, relative to lower weightings applied to warning messages, and even lower weightings applied to informational messages. The weights may be applied to exert a smoothing grade difference between informative, warning, and critical, error messages by using a logarithmic transformation on an inversely normalized total number of occurrences of each message type codes. As well, embodiments may mine customer LC logs to automatically identify, recreate, and create recommendations for resolution of, a problem experienced by customer hardware and/or software. This approach, in turn, may enable faster resolution of problems which may correspond to preservation, or improvement, of customer satisfaction.

C. Aspects of an Example Use Case

Directing attention now to FIG. 2, a table 200 is disclosed that includes examples of customer field issue LC logs 202. That is, in FIG. 2, each row corresponds to a respective LC log 202, and each LC log 202 may comprise various alphanumeric message codes 204, such as 'RED029' in row 6 for example, and 'LOG007' in row 10. Each of the LC logs 202 may be generated as the result of the operation of customer hardware and/or software. For example, in some embodiments one or more LC logs 202 may be generated while a customer server is running, while an application is running, or while a particular operation or group of operations is being performed by customer hardware and/or software. In some instances, an LC log 202 may be generated only during a defined period of time, that is, message codes may be logged between defined 'start' and 'stop' times. In any case, each of the LC logs 202 may comprise, or consist of, time series data in the form of message codes that have occurred in a particular time sequence, or order.

Thus, the number of columns in FIG. 2 may indicate the number of message codes logged for each of the rows. In the example of FIG. 2, each of the LC logs 202 includes 10 message codes, each of which is generated at a different time. More or fewer message codes may be included in an LC log 202. Although FIG. 2 indicates a configuration with 10 rows and 10 columns, any number of rows and/or columns may be used, and it is not required that there be the same number of rows and columns in any particular case. As is apparent, the columns collectively indicate, for each LC log 202, a respective order in which each message code 204 for that LC log 202 is generated. For example, and with reference to the LC log 202 of row 1, the message code 'WRK0001' is generated after the first instance of 'USR0032,' but before the second instance of 'USR0030.'

The various message codes 204 in an LC log 202 may respectively correspond to, and/or describe, various events that have taken place while customer hardware and/or software was running. The particular sequence of message codes 204 in a given LC log 202 may be unique. Thus, two LC logs 202 may contain the same numbers of the same message codes 204, but the order of the message codes 204 may be different in each of the LC logs 202.

With continued reference to the example of FIG. 2, a corresponding sample customer incident description may be: 'Repeated memory leaks occurred while running a Java based application' and the LC logs 202 may have been generated during the most recent run of that Java based application when one or more of the memory leaks occurred.

Below are just two illustrative examples of message codes and corresponding descriptions.

| Code | Description |
| --- | --- |
| MEM8501 | A low memory condition was detected. If this condition continues, a failover or a reset may occur. |
| OSE0003 | An OS graceful shut-down occurred. |

The field issue LC logs 202 in FIG. 2 comprise a total of 100 message codes 204 in sequence from left to right, and top to bottom. Thus, the oldest message code 204a is in the upper left cell, that is, 'USR0030' and the newest, or most recent, message code 204b is in the lower right cell, that is, 'MEM8500.' Thus, the example of FIG. 2 indicates an overall order in which the various message codes 204 were generated.

The message codes 204 may vary, for example, between Critical, Warning, and Informational categories. Given the LC logs 202 and corresponding message codes 204, a support engineer would have to identify the issue(s) in this field log and provide a solution to the customer. Given the large amount, and sequence, of data in the example of FIG. 2, which discloses a grouping of LC logs 202 that is relatively small compared to real life circumstances, it would be difficult or impossible for the support engineer to quickly identify the issue, and to also identify the method needed to reproduce that issue in a test environment such as a validation defects data warehouse. These problems are impossible for a human support engineer to resolve in real-life scenarios that may involve hundreds, thousands, or more, LC logs 202, each containing hundreds, thousands, or more message codes in a wide variety of different message code sequences.

Consistent with some example embodiments, the LC logs 202, which may be collectively referred to as a 'customer issue log,' may be compared with an existing knowledge warehouse of prior issue and validation test case runs. In connection with the illustrative example of FIG. 2, the LC logs and their data may be acquired from an existing knowledge warehouse that storehouses data and metadata concerning past problems experienced by customers. After the data has been acquired, the unique message code sequences may be extracted from that data for the performance of experiments, such as test runs for example.

Next, and with reference now to the example table 300 of FIG. 3, a data processing operation was performed that comprised mapping the message codes 204, which were acquired from the LC logs 202 data residing in the knowledge warehouse, with a dictionary of numeric codes, generally designated at 302, that each correspond to a respective alphanumeric message code. To illustrate, and with reference to the table 200, the message code 'SYS1001' at, for example, row 3-column 5, maps to numeric code '260' of the table 300 so that, in this example, each instance of 'SYS1001' in table 200 maps to a respective instance of '260' in table 300. Thus, the table 300 is an example of the output of the aforementioned data processing mapping operation. As another example, '692' in the table 300 corresponds to the message code 'USR0030' in the table 200, and the description for that message code may be, for example 'Successfully logged in using arg1, from arg2 and arg3.'

After the message codes have been mapped to numeric codes, an ML log transformation was implemented that comprised performing an SGT transformation on the data collected. Through the transformation, and with reference to the table 300, the relationship between each numeric message code 302 with the other numeric message codes 302 was captured. This dataset was a useful part of some example embodiments. An illustrative, partial, example of the result of the application of SGT to numeric message codes 302 of the table 300 is disclosed in the table 400 in FIG. 4. That is, the information in the table 400 may be generated by application of the SGT process to the numeric message codes 302 of the table 300. FIG. 5 discloses an illustrative portion of a single row 500 such as may be included in FIG. 4.

In the particular example of the table 400, the numeric code '341' has been compared with each of the other numeric codes to determine a strength of relationship between the compared numeric codes. Note that as the table 400 is provided for illustrative purposes, one or more of the numeric codes in the table 400 may not appear in the table 300.

In the table 400, each row corresponds to a respective LC log that includes a sequence of error codes (not shown in FIG. 4). The LC logs in table 400 may be customer LC logs and/or LC logs generated by performing one or more test runs of one or more computing processes. Each of the cells in the table 400 indicates a relative extent to which, in each LC log, the numeric message code 341 is 'near,' or is a short or long 'distance' from, the other numeric message codes in the message code sequence for that LC log. For example, with regard to the LC log to which row 0 corresponds, it can be seen that a relatively high value of 0.9894 is indicated for the comparison of numeric code 341 with numeric code 134. The value of 0.9894 may indicate, for example, that 134 follows closely, or immediately, after code 341 in the message code sequence of the LC log indicated by row 0. On the other hand, the value of 0.0327 in the message code sequence of the LC log indicated by row 5 suggests that there is relatively low correlation, or association, between 341 and 134 in that message code sequence. That is, and as disclosed herein, it may be said that 341 and 134 are relatively distant from one another in the message code sequence of the LC log indicated by row 5 while, on the other hand, it may be said that 341 and 134 are relatively close to one another in the message code sequence of the LC log indicated by row 0. Thus, it may be determined that there is a direct cause-and-effect relation between 134 and 341 in the LC log indicated by row 0, while the relation between 134 and 341 in the LC log indicated by row 5 may be of little or no significance.

Next, a feature engineering process was performed on the SGT process output, that is, the information in the table 400. In particular, the feature engineering process comprised classifying the message codes into one of 3 categories, namely, Critical, Warning, and Informational. A dimensionality reduction process using PCA (principal component analysis) was performed on the classified data, that is, the classified message codes, considering the data coverage at over 90% and keeping the features of the data intact.

A similarity comparison was then applied, using a cosine similarity approach, by comparing the customer field issue, as recorded in a customer LC log, against the entire knowledge base. This similarity comparison application was carried out with respect to the 3 feature engineered data sets separately. Categorical weightings were applied on similarity outputs which was assigned based on extensive experimentations. After application of the weightings, the similarity outputs were added to obtain the weighted comparison score for the customer field issue log against the knowledge base. The following weights were employed in this example use case: 0.99:1.7:2.18, for informative:warning:critical message codes, respectively.

Figure 6:
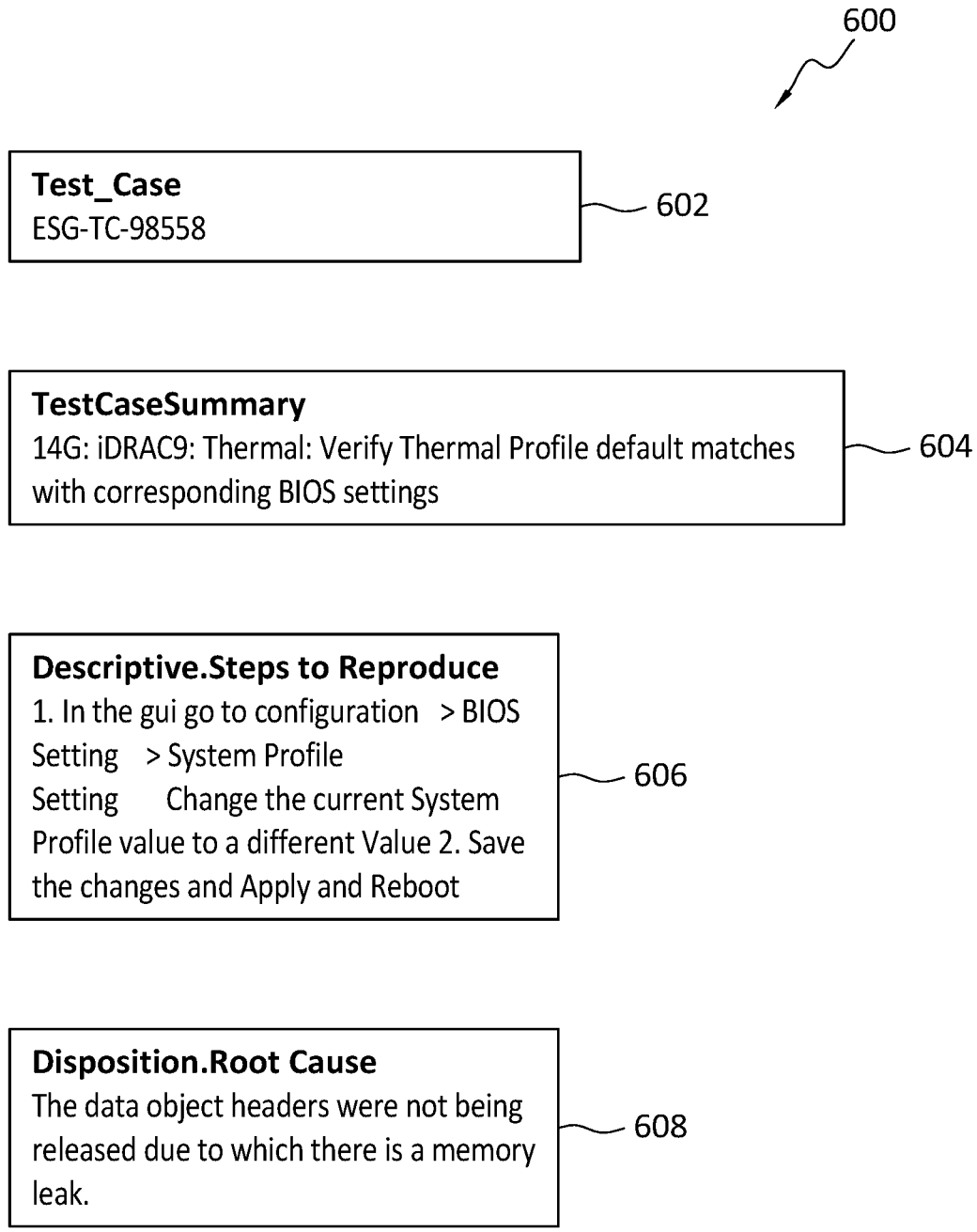
FIG. 6 discloses an example output of a similarity comparison process.

With reference now to FIG. 6, an example output 600 of a similarity comparison process is disclosed. The example output 600 may include a name and description 602 of the test case, such as 'ESG-TC-98558' for example. A test case summary 604 may include the processes performed as part of the test case. Next, a description 606 may be generated that describes the steps needed to reproduce the problem experienced by the customer. Finally, a root cause 608 may be identified that causes the problem noted in the description 606. Once the root cause 608 has been identified, the knowledge base may be consulted to identify a recommended solution to that problem.

With continued reference to FIG. 6, it can be seen that there was a memory leak issue due to the data objects being locked (e.g., root cause 608). The steps leading to that problem could be reproduced through the BIOS Settings GUI (e.g., description 606). This recommendation when shared with the support engineer, provides the support engineer with the root cause of the problem, and enables the support engineer to take the steps to reproduce the problem, which will help the time to resolve go down significantly relative to what it would have been without this information being available to the support engineer.

D. Example Methods

Figure 7:
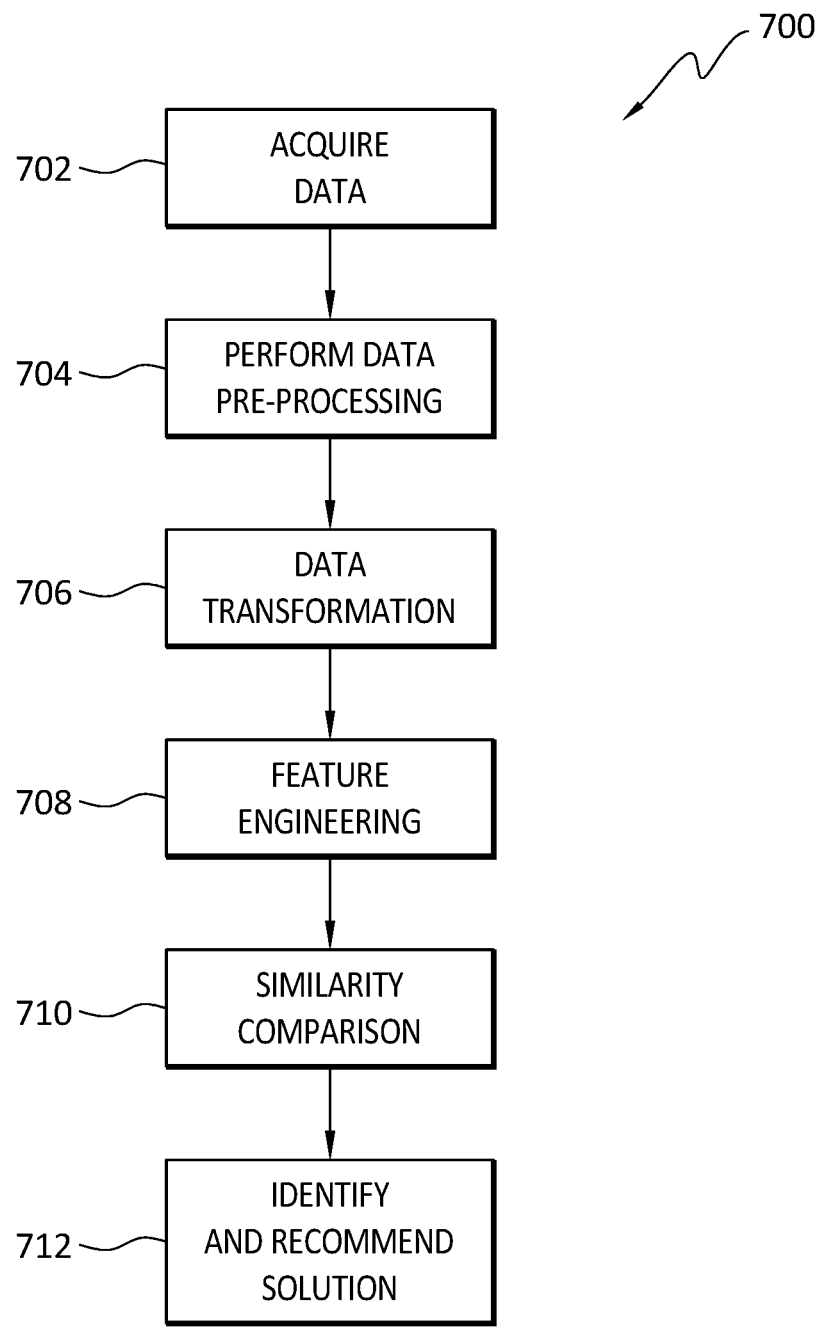
FIG. 7 discloses an example method for using a knowledge base to identify a solution to a customer field issue.

It is noted with respect to the example methods of FIGS. 1 and 7 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Embodiments of the method may be implemented by any suitable hardware and/or software. In some particular embodiments, the method may be performed in whole or in part by the Dell iDRAC platform. The scope of the invention is not limited to any particular hardware and/or software implementation however.

Directing attention now to FIG. 7, an example method 700 according to some embodiments of the invention is disclosed. The method 700 may begin with a data acquisition process 702. The data may be acquired 702 from a knowledge base that includes historical customer data concerning one or more problems experienced by one or more customers with their hardware and/or software. Additionally, or alternatively, the data may be acquired 702 in real time as the data is collected by one or more LC logs of one or more customers. The data acquired 702 may include one or more message code sequences that each comprise one or more message codes.

After the data has been acquired 702, pre-processing 704 of the acquired data may be performed. Such pre-processing may include, for example, mapping the message codes included in the acquired data, which may be alphanumeric message codes, to message codes included in a dictionary of message codes that may take the form of numeric message codes. The particular mapping employed may be specified by the dictionary.

An ML-implemented data transformation process 706, which may comprise an SGT process, may then be performed on the numeric message codes. An output of the ML-implemented data transformation process 706 may be the identification and capture of a relationship between each message code, of a message code sequence, and all the other message codes in that message code sequence.

Next, a feature engineering process 708 may be performed on the output of the data transformation process. The feature engineering process 708 may comprise classifying each numeric message code into one of a group of categories such as, for example, Critical, Warning, or Information. This classification may result in the generation of a respective dataset for each category. As part of the feature engineering process 708, or separately, a dimensionality reduction process may be performed on each of the datasets to reduce the complexity of the datasets, while largely preserving the data itself.

After the feature engineering process 708 has been performed, a similarity comparison 710 may be performed. The similarity comparison 710 may involve, for example, comparing a customer field issue to the information contained in the knowledge base. As noted earlier, the knowledge base may contain data and metadata generated by one or more test runs, and the knowledge base may additionally, or alternatively, contain data and metadata taken from logs that were generated during client hardware and/or software operations.

In some embodiments, the similarity comparison 710 may be performed separately on each of the datasets. Based on the comparing of the customer field issue to the knowledge base, a comparison score, which may be weighted, may be generated that reflects the relative similarity of the customer field issue to data in the knowledge base. A respective comparison score may be generated with respect to each database. The comparison scores may then be summed together to generate an overall weighted comparison score for the customer field issue with respect to the knowledge base. The output of the similarity comparison may include, for example: the name of the test case run that best corresponds to the customer field issue; a summary of the test case; identification of the steps needed to reproduce the customer field issue; and, identification of the root cause of the customer field issue.

Based on the output of the similarity comparison 710, a solution to the customer field issue may be identified and recommended 712. In some cases, identification and recommendation 712 of the solution may be performed automatically without human involvement or intervention. Further, the solution may be implemented automatically in some embodiments or, alternatively, at the direction of a human.

In some embodiments, data may be collected after the solution has been implemented so that an assessment can be performed as to the relative effectiveness of the solution. Depending upon the data that was collected, the solution may be modified, or replaced with another solution. These processes, as well as all of the other processes of the example method 700 may be performed using an ML model, although that is not necessarily required.

E. Further Example Embodiments

Following are some further example embodiments of the invention. These are presented only by way of example and are not intended to limit the scope of the invention in any way.

Embodiment 1. A method, comprising: acquiring data from a knowledge base that includes message codes indicating conditions that occurred during performance of one or more test runs of a computing operation, and the message codes are included in message code sequences; processing the data by mapping the message codes, and message codes included in a customer issue log, to codes that are readable by a machine learning process; transforming the data to generate an output that comprises, for each message code sequence, relationships between each of the message codes in that message code sequence; extracting features from the transformed data, and the extracting generates multiple datasets that include the features; performing a similarity comparison by comparing a customer field issue with the databases; and based on the similarity comparison, identifying and recommending a solution to the customer field issue.

Embodiment 2. The method as recited in embodiment 1, wherein the transforming comprises applying a sequence graph transformation to the data.

Embodiment 3. The method as recited in embodiment 2, wherein the transforming is performed using a machine learning model.

Embodiment 4. The method as recited in any of embodiments 1-3, wherein the multiple databases comprise a critical message database, a warning message database, and an informational message database.

Embodiment 5. The method as recited in any of embodiments 1-4, wherein the similarity comparison comprises a cosine similarity.

Embodiment 6. The method as recited in any of embodiments 1-5, wherein each of the databases corresponds to a respective message category, and each of the databases includes message codes that correspond to the respective message category.

Embodiment 7. The method as recited in any of embodiments 1-6, further comprising performing a dimensionality reduction process on data in the databases.

Embodiment 8. The method as recited in any of embodiments 1-7, further comprising obtaining a weighted comparison score for the customer issue log against the datasets.

Embodiment 9. The method as recited in any of embodiments 1-8, wherein identification and recommendation of the solution are performed automatically.

Embodiment 10. The method as recited in any of embodiments 1-9, further comprising weighting outputs of the similarity comparison and adding the weighted outputs to obtain a weighted comparison score for the customer field issue with respect to the knowledge base, and the recommended solution is identified based on the weighted comparison score.

Embodiment 11. A system for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
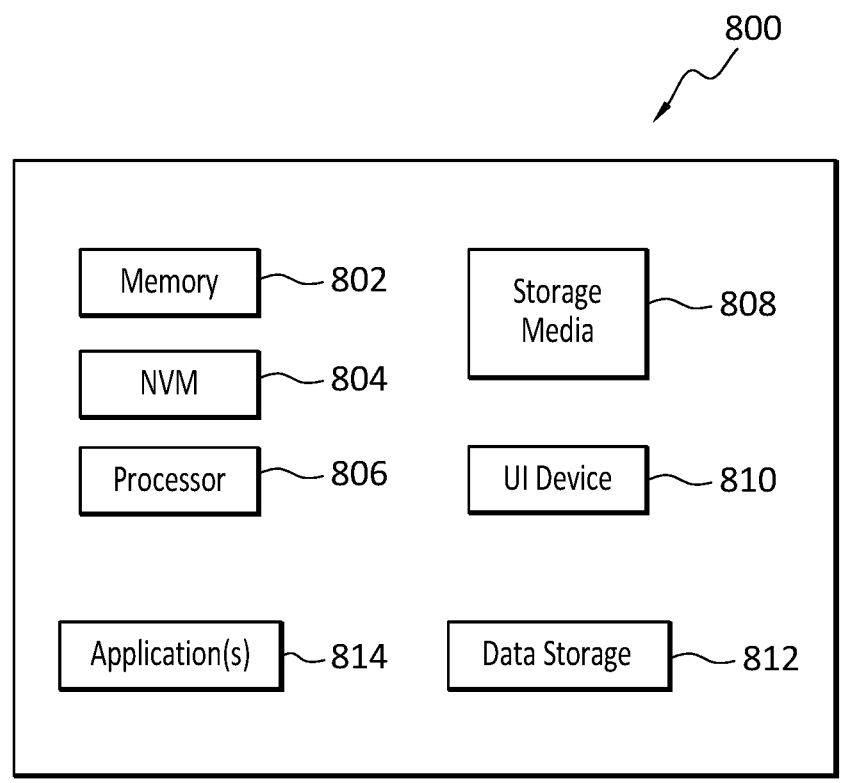
FIG. 8 discloses aspects of an example computing entity operable to perform any of the disclosed methods, processes, and operations.

With reference briefly now to FIG. 8, any one or more of the entities disclosed, or implied, by FIGS. 1-7 and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
acquiring data from a knowledge base that includes message codes indicating conditions that occurred during performance of one or more test runs of a computing operation, and the message codes are included in message code sequences;
processing the data by mapping the message codes, and message codes included in a customer issue log, to codes that are readable by a machine learning process;
transforming the data to generate an output that comprises, for each message code sequence, relationships between each of the message codes in that message code sequence, wherein transforming the data comprises applying a sequence graph transformation (SGT) to the data;
extracting features from the transformed data, and the extracting generates multiple datasets that include the features;
performing a similarity comparison by comparing a customer field issue with the datasets; and
based on the similarity comparison, identifying and recommending a solution to the customer field issue.

2. The method as recited in claim 1, wherein the transforming is performed using a machine learning model.

3. The method as recited in claim 1, wherein the multiple datasets comprise a critical message dataset, a warning message dataset, and an informational message dataset.

4. The method as recited in claim 1, wherein the similarity comparison comprises a cosine similarity.

5. The method as recited in claim 1, wherein each of the datasets corresponds to a respective message category, and each of the datasets includes message codes that correspond to the respective message category.

6. The method as recited in claim 1, further comprising performing a dimensionality reduction process on data in the datasets.

7. The method as recited in claim 1, further comprising obtaining a weighted comparison score for the customer issue log against the datasets.

8. The method as recited in claim 1, wherein identification and recommendation of the solution are performed automatically.

9. The method as recited in claim 1, further comprising weighting outputs of the similarity comparison and adding the weighted outputs to obtain a weighted comparison score for the customer field issue with respect to the knowledge base, and the recommended solution is identified based on the weighted comparison score.

10. A non-transitory storage medium having stored therein instructions that are executable by one or more hardware processors to perform operations comprising:
acquiring data from a knowledge base that includes message codes indicating conditions that occurred during performance of one or more test runs of a computing operation, and the message codes are included in message code sequences;
processing the data by mapping the message codes, and message codes included in a customer issue log, to codes that are readable by a machine learning process;
transforming the data to generate an output that comprises, for each message code sequence, relationships between each of the message codes in that message code sequence, wherein transforming the data comprises applying a sequence graph transformation (SGT) to the data;

extracting features from the transformed data, and the extracting generates multiple datasets that include the features;

performing a similarity comparison by comparing a customer field issue with the datasets; and based on the similarity comparison, identifying and recommending a solution to the customer field issue.

11. The non-transitory storage medium as recited in claim 10, wherein the transforming is performed using a machine learning model.

12. The non-transitory storage medium as recited in claim 10, wherein the multiple datasets comprise a critical message dataset, a warning message dataset, and an informational message dataset.

13. The non-transitory storage medium as recited in claim 10, wherein the similarity comparison comprises a cosine similarity.

14. The non-transitory storage medium as recited in claim 10, wherein each of the datasets corresponds to a respective message category, and each of the datasets includes message codes that correspond to the respective message category.

15. The non-transitory storage medium as recited in claim 10, further comprising performing a dimensionality reduction process on data in the datasets.

16. The non-transitory storage medium as recited in claim 10, wherein the operations further comprise obtaining a weighted comparison score for the customer issue log against the datasets.

17. The non-transitory storage medium as recited in claim 10, wherein identification and recommendation of the solution are performed automatically.

18. The non-transitory storage medium as recited in claim 10, further comprising weighting outputs of the similarity comparison and adding the weighted outputs to obtain a weighted comparison score for the customer field issue with respect to the knowledge base, and the recommended solution is identified based on the weighted comparison score.

* * * * *